(12) United States Patent
Deuri et al.

(10) Patent No.: US 10,158,743 B2
(45) Date of Patent: Dec. 18, 2018

(54) COMPUTE NODE CLUSTER MANAGEMENT

(71) Applicant: International Business Machines Corporation, Armonk, NY (US)

(72) Inventors: Kokil K. Deuri, Bangalore (IN); Madhusudhanan Duraisamy, Bangalore (IN); Arun H. Nagaraj, Bangalore (IN); Ponraj Venkatachalam, Tuticorin (IN)

(73) Assignee: International Business Machines Corporation, Armonk, NY (US)

( * ) Notice: Subject to any disclaimer, the term of this patent is extended or adjusted under 35 U.S.C. 154(b) by 198 days.

(21) Appl. No.: 15/180,034

(22) Filed: Jun. 12, 2016

(65) Prior Publication Data
US 2017/0359243 A1    Dec. 14, 2017

(51) Int. Cl.
G06F 15/16 (2006.01)
H04L 29/06 (2006.01)
H04L 29/08 (2006.01)
H04L 12/911 (2013.01)
H04L 12/741 (2013.01)
H04L 12/26 (2006.01)
H04L 12/24 (2006.01)

(52) U.S. Cl.
CPC .......... *H04L 69/08* (2013.01); *H04L 41/0627* (2013.01); *H04L 43/08* (2013.01); *H04L 43/10* (2013.01); *H04L 45/74* (2013.01); *H04L 47/823* (2013.01); *H04L 67/1097* (2013.01); *H04L 41/5019* (2013.01)

(58) Field of Classification Search
CPC .......................... H04L 69/08; H04L 67/1097
USPC ........................................................ 709/217
See application file for complete search history.

(56) References Cited

U.S. PATENT DOCUMENTS

| | | | |
|---|---|---|---|
| 6,907,543 B2 | 6/2005 | Hino et al. | |
| 7,631,066 B1 | 12/2009 | Schatz et al. | |
| 7,716,406 B1* | 5/2010 | Tyndall | G06F 13/387 340/2.1 |
| 2002/0019863 A1* | 2/2002 | Reuter | G06F 3/0605 709/221 |
| 2003/0065782 A1* | 4/2003 | Nishanov | G06F 9/5011 709/226 |
| 2003/0120743 A1* | 6/2003 | Coatney | G06F 3/0607 709/217 |
| 2005/0278465 A1* | 12/2005 | Qi | G06F 13/387 710/36 |

(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.

*Primary Examiner* — Karen C Tang
(74) *Attorney, Agent, or Firm* — David B. Woycechowsky

(57) ABSTRACT

Disclosed aspects relate to managing a cluster of compute nodes in a shared pool of configurable computing resources using a set of Small Computer System Interface Persistent Reservation (SCSI-PR) commands. The set of SCSI-PR commands may be used to monitor the cluster of compute nodes for an error event. The error event may be detected based on a set of values derived from the set of SCSI-PR commands. An error event response action may be determined with respect to the error event. Performance of the error event response action may be initiated.

20 Claims, 6 Drawing Sheets

(56) References Cited

U.S. PATENT DOCUMENTS

| | | | | |
|---|---|---|---|---|
| 2009/0327798 | A1* | 12/2009 | D'Amato | G06F 3/062 |
| | | | | 714/4.1 |
| 2011/0173506 | A1* | 7/2011 | Allen | G06F 3/0605 |
| | | | | 714/49 |
| 2011/0179231 | A1* | 7/2011 | Roush | G06F 3/0622 |
| | | | | 711/152 |
| 2013/0036240 | A1* | 2/2013 | Anumalasetty | G06F 11/1612 |
| | | | | 710/15 |
| 2013/0205297 | A1* | 8/2013 | Shimogawa | G06F 9/45558 |
| | | | | 718/1 |
| 2013/0227009 | A1* | 8/2013 | Padmanaban | G06F 17/30091 |
| | | | | 709/204 |
| 2014/0059302 | A1* | 2/2014 | Hayakawa | G06F 3/0644 |
| | | | | 711/153 |
| 2016/0080489 | A1* | 3/2016 | Ngo | H04L 67/1095 |
| | | | | 709/219 |

\* cited by examiner

COMPUTE NODE CLUSTER MANAGEMENT

BACKGROUND

This disclosure relates generally to computer systems and, more particularly, relates to managing a cluster of compute nodes in a shared pool of configurable computing resources using a set of Small Computer System Interface Persistent Reservation commands. Compute node cluster management may be desired to be performed as efficiently as possible. The amount of compute node clusters that need to be managed by enterprises is increasing. As compute node clusters needing to be managed increases, the need for compute node cluster management may increase.

SUMMARY

Aspects of the disclosure relate to managing a cluster of compute nodes in a shared pool of configurable computing resources using a set of Small Computer System Interface Persistent Reservation (SCSI-PR) commands. SCSI-PR commands may be used to discover the activity status of a compute node without the use of disk input/output operations. One or more compute nodes within a cluster may periodically register a persistent reservation (PR) key on a target device server. An algorithm can be used to change the PR registration key of the nodes in response to expiration of a timer corresponding to the respective compute nodes, such that the compute nodes use a new PR key for each registration instance. A set of monitor nodes may be configured to monitor the PR registration information for the compute nodes and detect one or more nodes associated with an error event. Leveraging SCSI-PR techniques to monitor compute node activity may facilitate efficient compute node cluster management.

Disclosed aspects relate to managing a cluster of compute nodes in a shared pool of configurable computing resources using a set of Small Computer System Interface Persistent Reservation (SCSI-PR) commands. The set of SCSI-PR commands may be used to monitor the cluster of compute nodes for an error event. The error event may be detected based on a set of values derived from the set of SCSI-PR commands. An error event response action may be determined with respect to the error event. Performance of the error event response action may be initiated.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
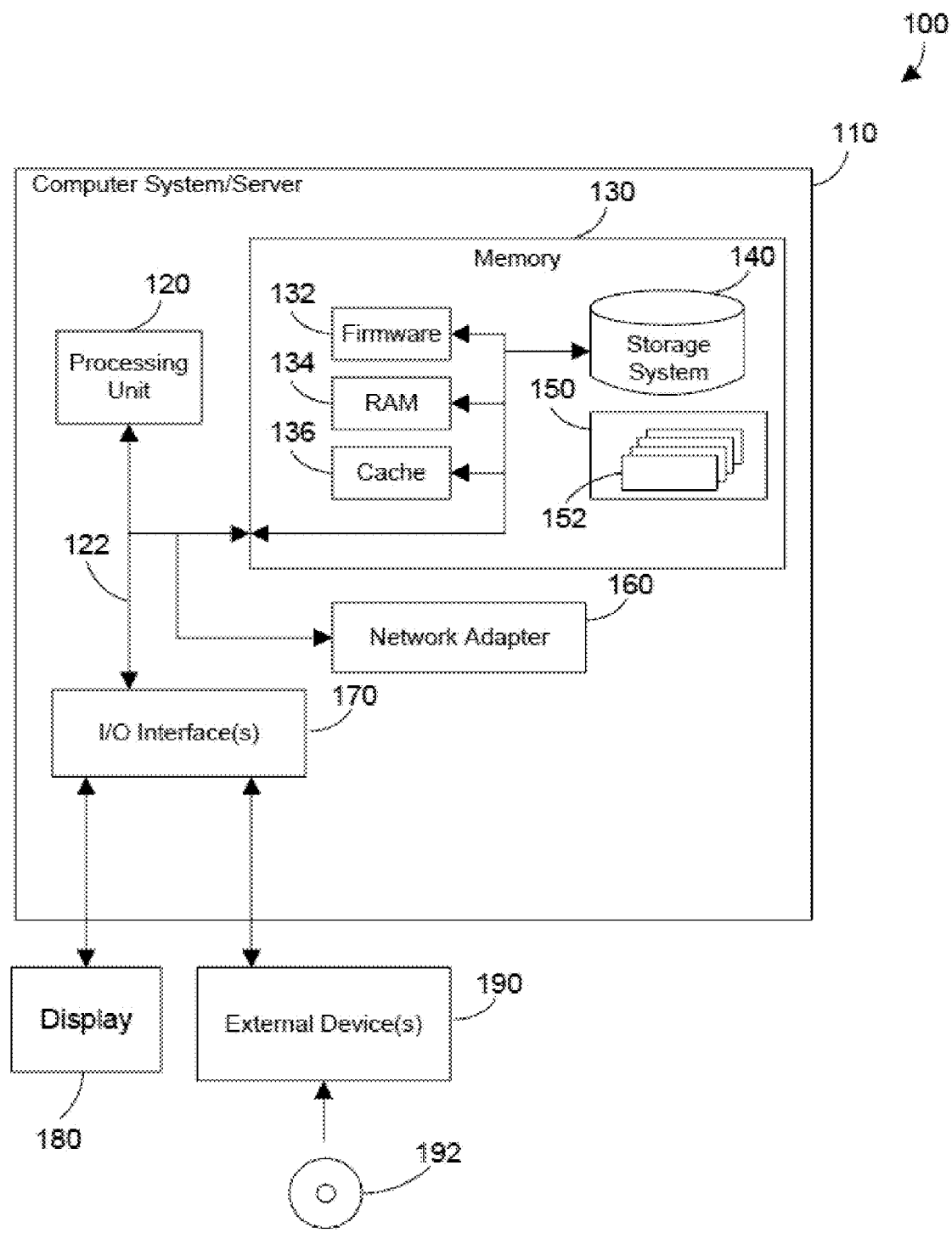
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure relate to managing a cluster of compute nodes in a shared pool of configurable computing resources using a set of Small Computer System Interface Persistent Reservation (SCSI-PR) commands. SCSI-PR commands may be used to discover the activity status of a compute node without the use of disk input/output operations. One or more compute nodes within a cluster (e.g., storage network, cloud computing environment) may periodically register a persistent reservation (PR) key on a target device server (e.g., master node). An algorithm can be used to change the PR registration key of the nodes in response to expiration of a timer corresponding to the respective compute nodes, such that the compute nodes use a new PR key for each registration instance. A set of monitor nodes may be configured to monitor the PR registration information for the compute nodes and detect one or more nodes associated with an error event (e.g., compute nodes that have not registered a new PR key within a determined time period). Leveraging SCSI-PR techniques to monitor compute node activity (e.g., heartbeat) may facilitate efficient compute node cluster management (e.g., without using disk input/output operations or dedicated disks).

In a compute node cluster environment, one important task is to monitor and determine the operational status (e.g., in-service or out-of-service) of each computer node of the cluster. It may also be desirable to maintain one or more privileged (e.g., master nodes) for performing particular tasks or jobs in the compute node cluster (e.g., based on the purpose of the cluster). Aspects of the disclosure relate to the recognition that, in certain situations, Transmission Control Protocol-Internet Protocol (TCP-IP) network-based methods or disk read/write methods may place constraints on compute node cluster resources, performance, or flexibility. Accordingly, aspects of the disclosure relate to managing a cluster of compute nodes using a set of Small Computer System Interface Persistent Reservation (SCSI-PR) commands to discover the activity status of a compute node without the use of disk input/output operations or TCP-IP network procedures. Aspects of the disclosure may provide performance or efficiency benefits when managing compute nodes in a compute node cluster (e.g., speed, flexibility, responsiveness, resource usage).

Aspects of the disclosure include a method, system, and computer program product for managing a cluster of compute nodes in a shared pool of configurable computing resources using a set of Small Computer System Interface Persistent Reservation (SCSI-PR) commands. Aspects of the disclosure relate to monitoring the cluster of compute nodes for an error event using the set of SCSI-PR commands. A set of monitor nodes may be selected from the cluster of compute nodes based on a node reliability factor for the cluster of compute nodes. In embodiments, the set of monitor nodes may be distributed among a set of different racks, a set of separate physical locations, and a set of different domains. The set of monitor nodes may instantiate a set of SCSI-PR registrant only commands, and identify a master node which arises out of the set of monitor nodes.

In embodiments, based on a first SCSI-PR command of the set of SCSI-PR commands, a first value with respect to a first compute node of the cluster of compute nodes may be captured. In embodiments, the cluster of compute nodes may include a shared disk. In embodiments, the cluster of compute nodes may include a flash array. Based on a second SCSI-PR command of the set of SCSI-PR commands, a second value may be detected with respect to the first compute node of the clusters of compute nodes. The first and second SCSI-PR commands may be a same command carried-out at different times. The second SCSI-PR command may occur in response to the first SCSI-PR command. In embodiments, the first value may be compared with the second value with respect to the first compute node. The first and second values may correspond to a set of SCSI-PR registration key values. The format of the set of SCSI-PR registration key values may include a node identifier and an incrementation value in a range from 0 to 0xFFFF. In embodiments, aspects of the disclosure relate to waiting for a temporal period based on a set of registration timers for the set of SCSI-PR registration key values. In response to waiting for the temporal period, the set of SCSI-PR registration key values may be incremented. In embodiments, it may be determined that the first value matches the second value (e.g., based on comparing).

Aspects of the disclosure relate to detecting an error event based on a set of values derived from the set of SCSI-PR commands. An error event response action may be determined with respect to the error event. In embodiments, the error event response action may include sensing that the first compute node was indicated as the master node, and re-instantiating the set of SCSI-PR registrant only commands. In embodiments, the error event response action may include marking one or more compute nodes with an out-of-service status. In embodiments, the error event response action may include preventing usage of the one or more compute nodes with the out of service status. Performance of the error event response action may be initiated. Aspects of the disclosure may provide performance or efficiency benefits when managing compute nodes in a compute node cluster (e.g., speed, flexibility, responsiveness, resource usage).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
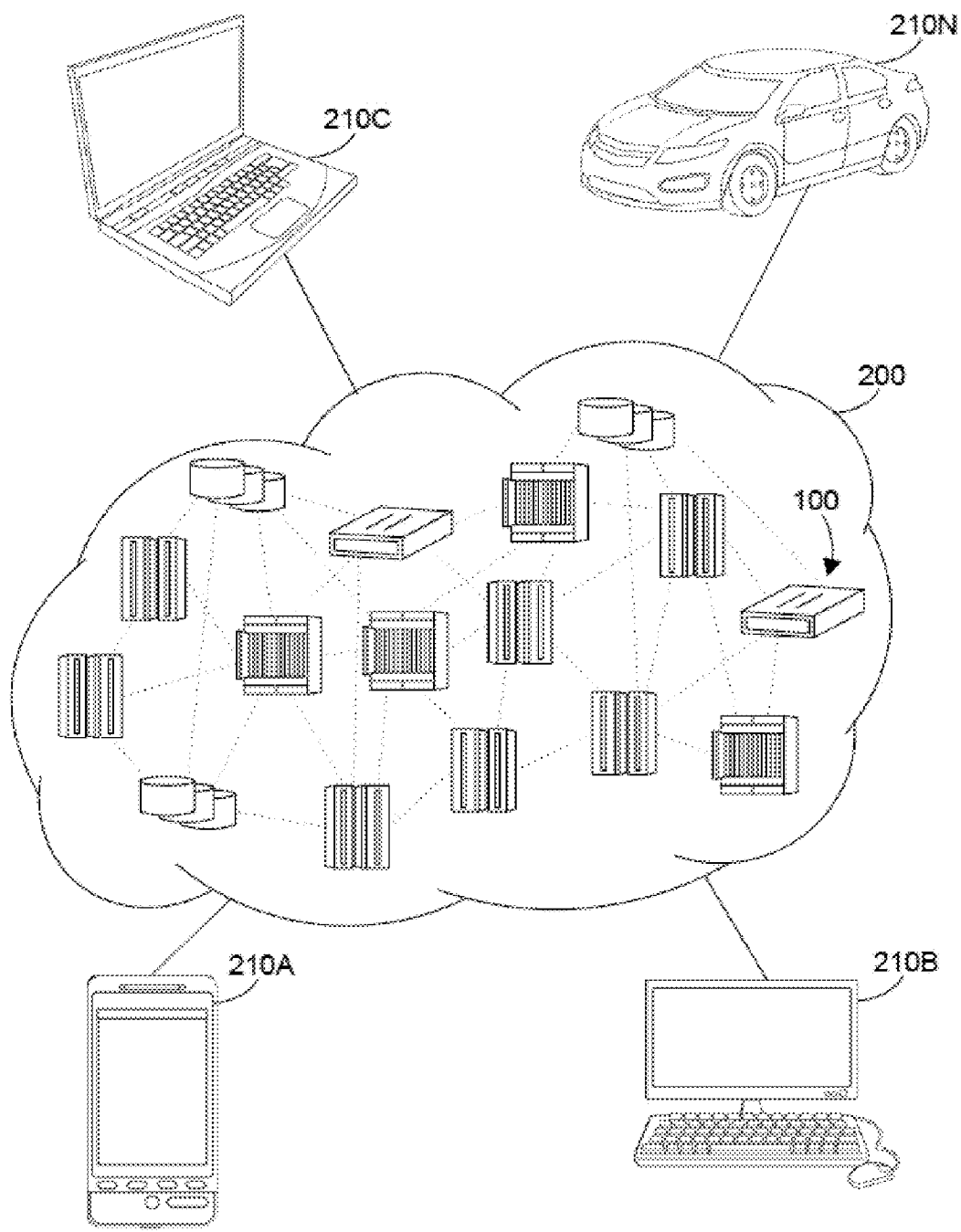
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
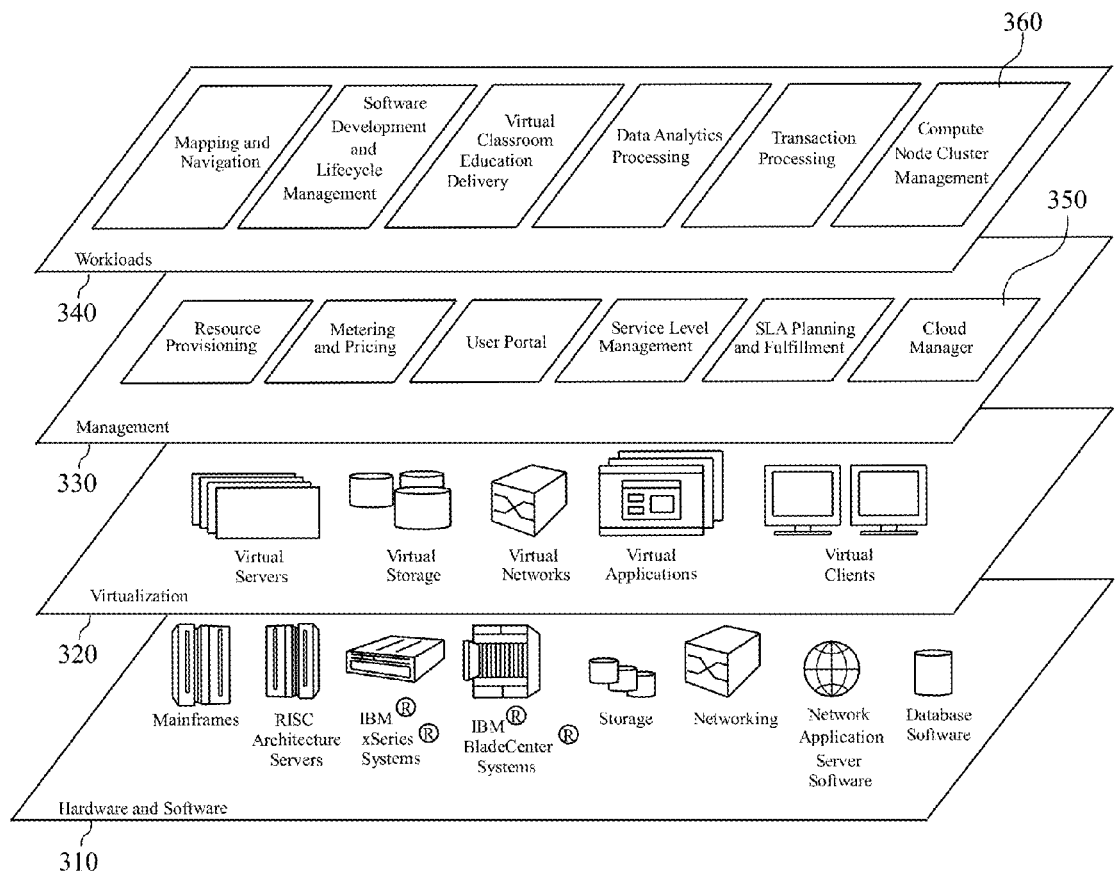
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and compute node cluster management 360, which may be utilized as discussed in more detail below.

Figure 4:
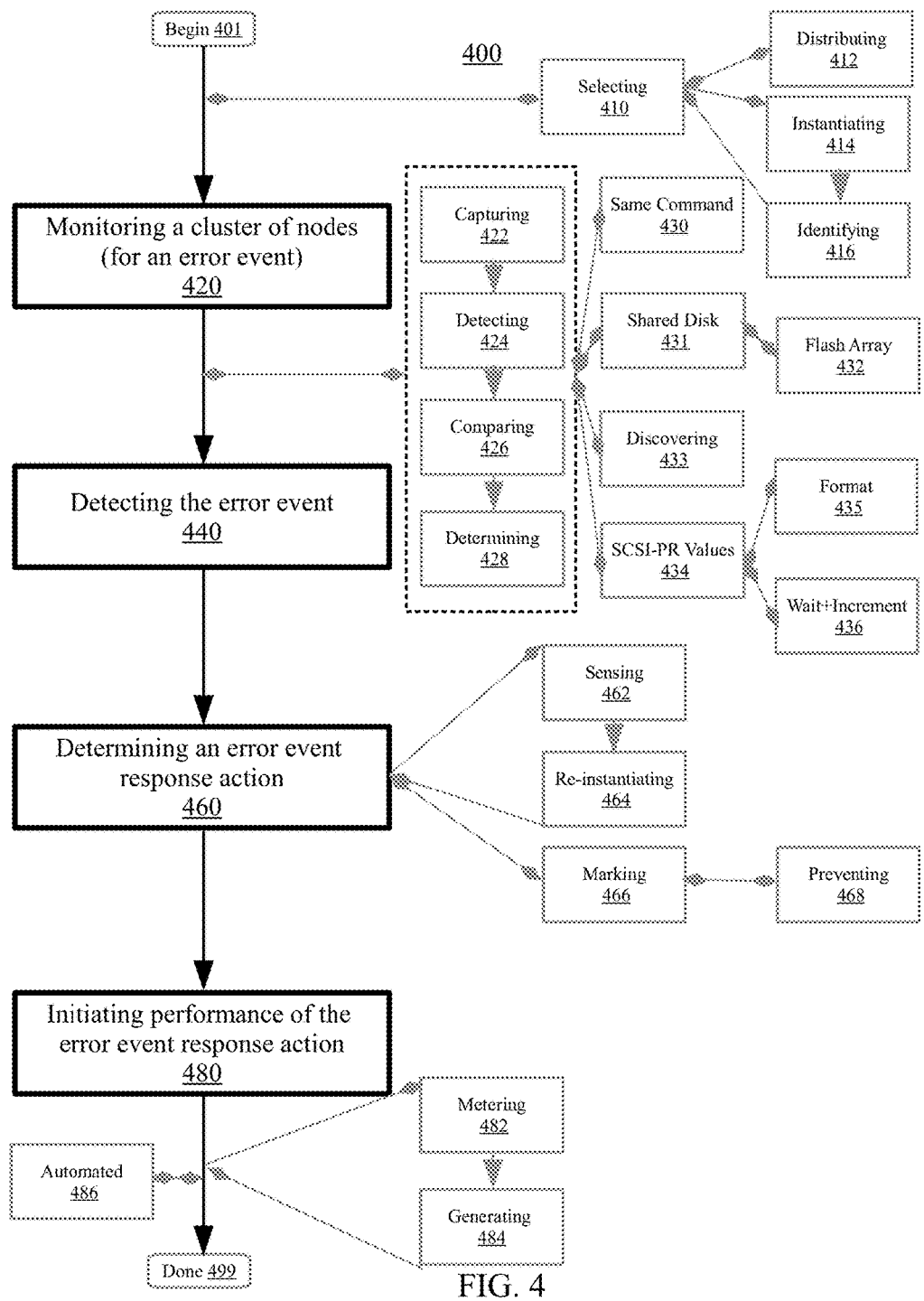
FIG. 4 is a flowchart illustrating a method for managing a cluster of compute nodes in a shared pool of configurable computing resources using a set of Small Computer System Interface Persistent Reservation (SCSI-PR) commands, according to embodiments.

FIG. 4 is a flowchart illustrating a method 400 for managing a cluster of compute nodes in a shared pool of configurable computing resources using a set of Small Computer System Interface Persistent Reservation (SCSI-PR) commands. Aspects of method 400 relate to using SCSI-PR commands to discover the activity status of a compute node within a cluster of compute nodes. In embodiments, the cluster of compute nodes may include a cluster of storage devices, a cloud computing environment of distributed compute nodes, or other group of compute nodes. Generally, the SCSI-PR commands can include a set of standards that define commands, protocols and interface mechanisms for connecting and transferring data between computers and peripheral devices. In embodiments, the SCSI-PR commands can include protocols and commands for facilitating communication between computing nodes in a cluster (e.g., storage cluster or cloud computing environment). Leveraging SCSI-PR techniques to monitor compute node activity (e.g., heartbeat) may facilitate efficient compute node cluster management (e.g., without using disk input-output operations or dedicated disks). The method 400 may begin at block 401.

In embodiments, a set of monitor nodes may be selected from the cluster of compute nodes at block 410. The monitor nodes may be selected based on a node reliability factor for the cluster of compute nodes. Generally, selecting can include choosing, electing, deciding, picking, ascertaining, or otherwise determining the set of monitor nodes. The set of monitor nodes can include one or more compute nodes from among the cluster of compute nodes that are configured to inspect the compute nodes of the cluster to detect an error event. As described herein, the set of monitor nodes may be configured to use SCSI-PR commands to monitor for the error event (e.g., PR registration techniques). In embodiments, the set of monitor nodes can be selected based on a node reliability factor for the cluster of compute nodes. The node reliability factor can include an indication of the dependability, trustworthiness, or consistency of the service performance of a particular compute node in the cluster. In embodiments, the node reliability factor may be based on historical performance data for a compute node. For instance, the historical data may include records of the service outage frequency, hardware component information (e.g., component age, usage level, manufacturer), total out-of-service time, maintenance information (e.g., frequency, details of repair operations) and the like. In embodiments, the node reliability factor may be expressed as an integer between 0 and 100, such that relatively low numbers indicate lesser reliability (e.g., compute nodes with frequent outages, hardware failures) and relatively high numbers indicate greater reliability (e.g., infrequent outages, low hardware component failure rate). As such, in embodiments, compute nodes with a node reliability factor above a threshold may be selected (e.g., automatically) as monitor nodes. In embodiments, a compute node cluster with a substantially high average node reliability factor may be associated with a relatively fewer number of monitor nodes. In certain embodiments, a compute node cluster with a substantially low average node reliability factor may be associated with a relatively greater number of monitor nodes. Other methods of selecting the set of monitor nodes are also possible.

In embodiments, the set of monitor nodes may be distributed at block 412. The set of monitor nodes may be distributed among a set of different racks, a set of separate physical locations, and a set of different domains. Generally, distributing can include allocating, spreading-out, assigning, or otherwise arranging the set of monitor nodes. In embodiments, aspects of the disclosure relate to the recognition that spreading the set of monitor nodes out within the compute node cluster may have positive impacts with respect to error event detection. Accordingly, in embodiments, the monitor nodes may be placed or selected such that each monitor node supervises approximately the same number of compute nodes of the cluster. The monitor node distribution may differ based on the infrastructure and needs of the compute node cluster. For instance, in a local storage cluster, the set of monitor nodes may be distributed among different racks (e.g., mounting frames, enclosures). As another example, in a cloud computing environment, the set of monitor nodes may be spread out across different geographic locations. In embodiments, distributing the set of monitor nodes may include selecting compute nodes as monitor nodes based on both the physical location as well as the node reliability for each node. Other methods of distributing the set of monitor nodes are also possible.

In embodiments, a set of SCSI-PR registrant only commands may be instantiated by the set of monitor nodes at block 414. Generally, instantiating can include initializing, capturing, reserving, pinging, or otherwise establishing the set of SCSI-PR registrant only commands. In embodiments, instantiating the set of SCSI-PR registrant only commands can include capturing a set of PR registration requests submitted by one or more compute nodes of the cluster of compute nodes. For instance, in response to detecting submission of the SCSI-PR registrant only commands, the set of monitor nodes may each submit a receive request to accept delivery of the SCSI-PR registrant only commands. In embodiments, the receive request of one of the monitor nodes may be granted, and the set of SCSI-PR registrant only commands may be instantiated (e.g., captured or recorded in a database). Other methods of instantiating the set of SCSI-PR registrant only commands are also possible.

In embodiments, a master node which arises out of the set of monitor nodes may be identified at block 416. Generally, identifying can include selecting, ascertaining, choosing, electing, or otherwise determining the master node. The master node can include a compute node that is configured to receive PR registration requests from compute nodes belonging to the cluster of compute nodes. In embodiments, the master node may be configured to receive the PR registration requests from compute nodes of the cluster, and log or record the PR registration information in a database, index, directory, or other organized data structure. In certain embodiments, the SCSI-PR registration requests may be recorded in a central database hosted by a shared disk device server accessible by the master node and the set of monitor nodes. In embodiments, the database may be stored in a shared logical unit. In embodiments, identifying the master node may include electing the monitor node that instantiated the set of SCSI-PR commands as the master node. Other methods of identifying the master node from among the set of monitor nodes are also possible.

At block 420, the cluster of compute nodes may be monitored for an error event. The cluster of compute nodes may be monitored using the set of SCSI-PR commands. Generally, monitoring can include observing, inspecting, surveying, checking, or scanning for the error event. In embodiments, monitoring can include using a software application (e.g., internal or external to the cluster of compute nodes), compute node (e.g., monitor node), network traffic monitor, diagnostic tool, or other technique to aggregate information related to the activity state of the cluster of compute nodes. In embodiments, aspects of the disclosure relate to using a set of monitor nodes selected from among the cluster of compute nodes to monitor for the error event. The error event may include an issue, defect, failure, deficiency (e.g., resources), or other unexpected result that occurs in relation to one or more compute nodes of the cluster. For example, the error event may include an out-of-service error (e.g., lack of heartbeat) compute node hardware failure, network communication error, resource insufficiency, application incompatibility, or the like. In embodiments, the error event may be monitored for using the set of SCSI-PR commands. For instance, the SCSI-PR commands may be used to verify the activity status of one or more compute nodes of the cluster (e.g., using PR registration). Other methods of monitoring the cluster of compute nodes for the error event are also possible.

In embodiments, the cluster of compute nodes may include a shared disk at block 431. Generally, the shared disk can include a distributed computing architecture in which all disks are accessible from all compute nodes of the cluster. Aspects of the disclosure relate to the recognition that, in certain computing environments, data storage capacity and security may be valued more highly in relation to other computing resources (e.g., network bandwidth, processing power, memory). Accordingly, in embodiments, aspects of the disclosure relate to a cluster of compute nodes that include a storage-oriented compute node cluster. The storage-oriented compute node cluster may include a local on-site storage cluster or distributed cloud storage environment. The storage-oriented compute node cluster may be structured using a tightly-clustered infrastructure, loosely-coupled infrastructure, or other network architectures. In embodiments, the storage-oriented compute node cluster may include a number of hard disk drives, solid state drives, and other storage devices configured to share workloads, storage capacity, and other resources to facilitate performance, capacity, or reliability of data storage. In certain embodiments, the cluster of compute nodes may include a flash array at block 432. Generally, the flash array may include a network or system of solid state storage disks including multiple flash memory drives (e.g., instead of traditional spinning hard disk drives). The flash array may be associated with positive benefits including increased data read and write speeds with respect to electromechanical disk drives. Other types of compute node clusters are also possible.

In embodiments, a first value with respect to a first compute node of the cluster of compute notes may be captured at block 422. The first value may be captured based on a first SCSI-PR command of the set of SCSI-PR commands. Generally, capturing can include saving, collecting, gathering, aggregating, recording, or otherwise storing the first value. In embodiments, aspects of the disclosure relate to assessing the operational status (e.g., service availability) of the cluster of compute nodes using SCSI-PR commands. As such, one or more compute nodes of the cluster of compute nodes may be configured to submit a first SCSI-PR command to indicate an active/available operational status. The first SCSI-PR command may include a PR registration request submitted to a central database maintained on a shared disk device server. In embodiments, the first SCSI-PR command may be associated with a first value (e.g., PR registration key) corresponding to the first compute node. Accordingly, in embodiments, the first value may be identified and captured in the central database maintained on the shared disk device server. For instance, a new data entry may be created in the central database for the first compute node, and the first value may be recorded in the central database in association with the data entry for the first compute node. Other methods of capturing the first value are also possible.

In embodiments, a second value with respect to the first compute node of the cluster of compute nodes may be detected at block 424. The second value may be detected based on a second SCSI-PR command of the set of SCSI-PR commands. Generally, detecting can include recognizing, discovering, ascertaining, discerning, or otherwise identifying the second value. Detecting may include receiving (e.g., by a master node) a second SCSI-PR command including the second value. In embodiments, detecting may include checking the central database and ascertaining that the first value has not been updated for a determined time period. In certain embodiments, the first and second SCSI-PR commands may be a same command carried out at different times at block 430. For instance, the second SCSI-PR command may include a PR registration request for indicating the operational status of the first compute node (e.g., substantially similar to the first SCSI-PR command) by registering the second value in the central database maintained on the shared disk device server. In embodiments, the second SCSI-PR command may occur in response to the first SCSI-PR command. For example, the second SCSI-PR command may be transmitted from the first compute node subsequent to registration of the first value in the central database. In embodiments, the second value may be captured and stored in the central database in association with the data entry for the first compute node. In certain embodiments, the second value may be an updated or modified (e.g., incremented) version of the first value. Other methods of detecting the second value are also possible.

In embodiments, the first and second values may correspond to a set of SCSI-PR registration key values at block 434. Generally, the SCSI-PR registration key values can include a series of characters that include both an indication of a particular node of the cluster of compute nodes and an iterative counter for tracking a number of PR registration instances. In embodiments, the format of the SCSI-PR registration key values may include a node identifier and an incrementation value in a range from 0 to 0xFFFF at block 435. Generally, the format of the SCSI-PR registration key values may include a 64-bit compound number (e.g., in hexadecimal) having both the node identifier and the incrementation value. The node identifier may include a number, letter, symbol, or other character that indicates or calls out a particular compute node of the cluster of compute nodes. For example, in a cluster of 5 compute nodes, each compute node may be assigned a node identifier of an integer in the range 1 through 5. In embodiments, the format of the set of SCSI-PR registration key values may include an incrementation value in a range from 0 to 0xFFFF. The incrementation value may include a counter configured to periodically increment (e.g., based upon a timer). As an example, the SCSI-PR registration key may be "0x0000000000020639," wherein "2" indicates Node 2 of a cluster of compute nodes, and 639 represents the current incrementation value (e.g., 1593 expressed as a 64-bit hexadecimal value). Other formats for the first and second values are also possible.

In embodiments, a temporal period may be waited for at block 436. The temporal period may be based on a set of registration timers for the set of SCSI-PR registration key values. Generally, waiting can include pausing, delaying, queuing, or scheduling the temporal period. In embodiments, aspects of the disclosure relate toward assigning a registration timer to one or more compute nodes of the cluster to facilitate PR registration. For instance, one or more compute nodes of the cluster may be associated with a registration timer (e.g., Tr) that is set for a particular temporal period (e.g., 30 seconds, 1 minute, 5 minutes, 30 minutes, 1 hour). In embodiments, aspects of the disclosure relate to incrementing the set of SCSI-PR registration key values in response to waiting for the temporal period. Generally, incrementing can include counting, advancing, or otherwise increasing the incrementation counter of the SCSI-PR registration key for one or more compute nodes. As described herein, the set of SCSI-PR registration key values may include both a node identifier to indicate a particular compute node of the cluster, and an incrementation counter configured to increment based on a registration timer. Consider the following example. A first node of the cluster may have a SCSI-PR registration key of "0x000000000005000A," and be assigned a registration timer with a temporal period of 4 minutes. The registration timer may tick downward toward from 4 minutes, and when the temporal period has elapsed the SCSI-PR registration key of the first node may be incremented to "0x000000000005000B." In embodiments, aspects of the disclosure relate to configuring the compute nodes of the cluster to submit PR registration requests (e.g., to a central database maintained on a shared disk device server) in response to incrementation of the SCSI-PR registration key. Other methods of managing waiting and incrementing for the set of registration timers are also possible.

In embodiments, the first value may be compared with the second value at block 426. The first value may be compared with the second value with respect to the first compute node. Generally, comparing can include contrasting, correlating, juxtaposing, evaluating, or otherwise examining the first value with respect to the second value. In embodiments, comparing the first value (e.g., first PR registration key) with the second value (e.g.,) may include juxtaposing the second value (e.g., included in a PR registration request received from a compute node) with the first value stored in the central database. Consider the following example. A first value of "0x0000000000030085" may be stored in the central database (e.g., in association with Node 3 of the cluster). In embodiments, a second value of "0x0000000000030086" may be detected (e.g., in a PR registration request from Node 3). Accordingly, the first value of "0x0000000000030085" may be examined with respect to the second value of "0x0000000000030086." Other methods of comparing the first and second values are also possible.

In embodiments, it may be determined that the first value matches the second value at block 428. Generally, determining can include identifying, ascertaining, detecting, or establishing that the first value matches the second value. In embodiments, determining the match may include detecting a correspondence between the first value and the second value. For instance, each character (e.g., number, letter, symbol) of the first value's incrementation counter may be inspected with respect to a character occupying a corresponding position of the second value's incrementation counter, and ascertaining that they are substantially similar (e.g., the same). Consider the following example. A first value of "0x0000000000073E8B" may be stored in the central database. In embodiments, a second value of "0x0000000000073E8B" may be detected. As such, in response to comparing the first value with the second value, it may be ascertained that, as each character of the first value is the same as the character in the corresponding position of the second value, the first value matches the second value. Other methods of determining that the first value matches the second value are also possible.

In embodiments, aspects of the disclosure relate to discovering an operational status of the first compute node at block 433. In embodiments, the operational status of the first compute node may be discovered without disk input-output (e.g., read/write commands to a disk) from an access operation. As such, aspects of the disclosure may be associated with positive impacts such as increased speed and faster response time. Additionally, the use of dedicated disks for compute node operational status monitoring may be reduced. In embodiments, the operational status of the first compute node may be discovered independent of Transmission Control Protocol/Internet Protocol (TCP/IP). For instance, in certain embodiments, discovery of the operational status of a particular compute node may take place within the compute node cluster (e.g., by monitoring notes), such that network outages may not affect the ability to determine the operational status of a node. Accordingly, aspects of the disclosure may be associated with positive impacts for node operational status determination. Other methods of discovering the operational status of a compute node are also possible.

At block 440, an error event may be detected based on a set of values derived from the set of SCSI-PR commands. Generally, detecting can include recognizing, discovering, ascertaining, sensing, determining, or otherwise identifying the error event. As described herein, the error event can include an issue, defect, failure, deficiency (e.g., network resources, hardware resources), or other unexpected result that occurs in relation to one or more compute nodes of the cluster. For instance, the error event may result in one or more compute nodes becoming out-of-service, unavailable, or non-operational. In embodiments, the error event may be detected in response to determining that a first value (e.g., first PR registration key) matches a second value (e.g., second PR registration key). As described herein, determining that the first value matches the second value may indicate that a particular node has not performed PR registration with an updated PR registration key for a defined time period, and may thus be non-operational or not functioning correctly. In response to detecting the error event, one or more compute nodes associated with the error event may be examined or inspected to gather information regarding the nature (e.g., cause, trigger conditions, severity) of the error event. The information gathered regarding the error event may be stored in an archive or database. Other methods of detecting the error event based on the set of derived values are also possible.

Consider the following example. A central database maintained on a shared disk device server may include a data entry for a first compute node. The first data entry may indicate an associated first PR registration key of "0x000000000006000F." As described herein, a monitor node may periodically survey the set of nodes of the cluster of compute nodes (e.g., based on a timer), and determine that a temporal period for the first compute node has elapsed, but that a new PR registration has not been submitted. As such, the monitor node may detect a second PR registration key for the first node. In embodiments, the second PR registration key may be "0x000000000006000F." As described herein, the first and second PR registration keys may be compared, and it may be determined that the first PR registration key matches the second PR registration key. Accordingly, in response to determining that the first and second PR registration keys match, an error event may be detected for the first compute node. Other methods of detecting the error event are also possible.

At block 460, an error event response action may be determined with respect to the error event. Generally, determining can include identifying, ascertaining, selecting, or establishing the error event response action. The error event response action can include a solution, fix, technique, or other action to mitigate, reduce, or resolve the error event. In embodiments, determining the error event response action can include examining the error event (e.g., potential causes, trigger conditions, severity) and ascertaining a technique or operation associated with positive impacts with respect to the error event. For instance, determining the error event response action may include consulting historical data including error logs, error management databases, or other archives in order to identify error event responses used in the past to positively impact similar error events. In embodiments, a set of error event data for the error event may be used to facilitate identification of an appropriate error event response action. As an example, for an error event of "file transfer failure," an error event response action of "file transfer path verification" may be determined. As other examples, the error event response action may also include workload reassignment, application migration, data backup, data transfer, or the like. Other methods of determining the error event response action are also possible.

In embodiments, the error event response action may include sensing that the first compute node was indicated as the master node at block 462. Generally, sensing can include recognizing, discovering, ascertaining, determining, or otherwise identifying that the first compute node was indicated as the master node. As described herein, aspects of the disclosure relate to selecting one node of the cluster of compute nodes as a master node configured to receive PR registration requests from compute nodes of the cluster, and log or record the PR registration information in a database, index, directory, or other organized data structure. In certain embodiments, aspects of the disclosure relate to the recognition that an error event may occur in association with the master node (e.g., rendering the master node inoperable or otherwise unable to perform master node operations). Accordingly, one or more monitor nodes of the compute node cluster may be configured to sense that the master node is associated with an error event. In embodiments, sensing that the first compute node was indicated as the master node may include analyzing data associated with the error event, and ascertaining that the master node is affected by the error event. Other methods of sensing that the first compute node was indicated as the master node are also possible.

In embodiments, the set of SCSI-PR registrant only commands may be re-instantiated at block 464. Generally, re-instantiating can include initializing, capturing, reserving, pinging, or otherwise establishing the registrant only commands (e.g., for a second or more time). In embodiments, re-instantiating the SCSI-PR registrant only commands may include electing a new master node to establish the registrant only commands. For instance, in response to sensing that an error event occurred in association with the master node, the monitor nodes of the compute node cluster may each submit a receive request to accept delivery of the SCSI-PR registrant only commands. The receive request of one of the monitor nodes may be granted, and that monitor node may be elected as the new master node. In response to electing the new master node, the new master node may re-instantiate the set of SCSI-PR registrant only commands (e.g., receiving PR registration submissions from compute nodes and capturing them in a database) and assume other master node operations (e.g., database maintenance). Other methods of re-instantiating the set of SCSI-PR registrant only commands are also possible.

In embodiments, the error event response action may include marking one or more compute nodes with an out-of-service status at block 466. Generally, marking can include tagging, designating, specifying, indicating, or otherwise identifying one or more of the compute nodes with the out-of-service status. In embodiments, the out-of-service status may represent or signify that the marked compute nodes are unavailable or inoperable (e.g., as the result of an error event). In embodiments, marking may include accessing a central database configured to maintain data regarding the cluster of compute nodes, and changing the operational status of one or more nodes from "In-service" to "Out-of-service." In embodiments, marking the one or more compute nodes may include transmitting a notification to a network administrator, monitoring node, remote server, or other computing device to indicate that the one or more compute nodes are out of service. Other methods of marking the compute nodes with an out-of-service status are also possible.

In embodiments, the error event response action may include preventing usage of the one or more compute nodes with the out-of-service status at block 468. Generally, preventing can include limiting, reducing, blocking, forbidding, or otherwise restricting access to or usage of the one or more compute nodes with the out-of-service status. In embodiments, preventing usage of the one or more compute nodes may include restricting data transfer to or from the one or more compute nodes. For instance, data files, workloads, or applications that were scheduled to be transferred to an out-of-service compute node may be rerouted to another compute node of the cluster. In certain embodiments, the extent to which access to the out-of-service compute nodes is prevented may be based on the nature of the error event. As an example, for a compute node that is associated with an error event including "storage capacity reached," access requests for "read-only access" to the compute node may be permitted, while "write access" requests may be denied. Other methods of preventing usage of the one or more compute nodes with the out-of-service status are also possible.

At block 480, performance of the error event response action may be initiated. Generally, initiating can include beginning, starting, running, executing, carrying-out, establishing, or otherwise putting the error event response action into operation. In embodiments, initiating performance of the error event may include selecting a performance configuration of the compute node cluster for the error event response action. The performance configuration may include an arrangement of software and hardware resources within the compute node cluster to facilitate implementation of the error event response action. In embodiments, initiating performance of the error event response action may include assigning the error event response action to a particular computing environment (e.g., virtual machine, physical compute node), allocating resources for performance of the error event response action, scheduling the event response action in a job scheduler (e.g., choosing an execution time, execution frequency), or configuring other aspects of the compute node cluster for performance of the error event response action based on the nature of the error event. Other methods of performing the error event response action are also possible.

Consider the following example. In embodiments, an error event of "hardware failure" may be detected with respect to a first compute node. As described herein, the first compute node may be analyzed to collect information regarding the nature of the error event. In response to analyzing the first node, an error event response action of "workload migration" may be determined to transfer data and applications from the first compute node to another compute node in the cluster. Accordingly, other compute nodes within the cluster may be evaluated to determine compatibility (e.g., resource availability, driver/operating system support) with the workload. In response to ascertaining a suitable host, the workload of the first compute node may be migrated to the host node. In embodiments, the applications, tasks, and other workload operations of the migrated workload may be initiated on the new host node. Other methods of managing the error event response action are also possible.

In embodiments, use of the SCSI-PR commands may be metered at block 482. Metering can include measuring, tracking, documenting, recording, or calculating the degree or extent of the utilization of the SCSI-PR commands. The degree of utilization may be calculated based on the number of times the SCSI-PR commands were issued (e.g., 10 times, 100 times), the number of times a compute node performed PR registration, resource usage (e.g., of the monitor nodes and master node to manage PR registration) or other means. Based on the metered use, an invoice may be generated at block 484. The invoice may include a bill, fee, service charge, or other itemized breakdown specifying compensation for the usage of the SCSI-PR commands. Subscription based models are also possible.

In certain embodiments, the monitoring, the detecting, the determining, the initiating, and other steps described herein may each occur in an automated fashion without user intervention at block 486. In embodiments, the monitoring, the detecting, the determining, the initiating, and other steps described herein may be carried out by an internal SCSI-PR management module maintained in a persistent storage device of a computing node of the compute node cluster. In certain embodiments, the steps described herein may be carried out by an external SCSI-PR management module hosted by a remote computing device or server (e.g., accessible via a subscription, usage-based, or other service model).

Method 400 concludes at block 499. Aspects of method 400 may provide performance or efficiency benefits for managing a cluster of compute nodes in a shared pool of configurable computing resources. For example, aspects of method 400 may have positive impacts with respect to compute node operational state determination. As described herein, the monitoring, detecting, determining, and initiating described herein may each occur in an automated fashion without user intervention. Altogether, leveraging SCSI-PR techniques to monitor compute node activity (e.g., heartbeat) may facilitate efficient compute node cluster management (e.g., without using disk input/output operations or dedicated disks).

Figure 5:
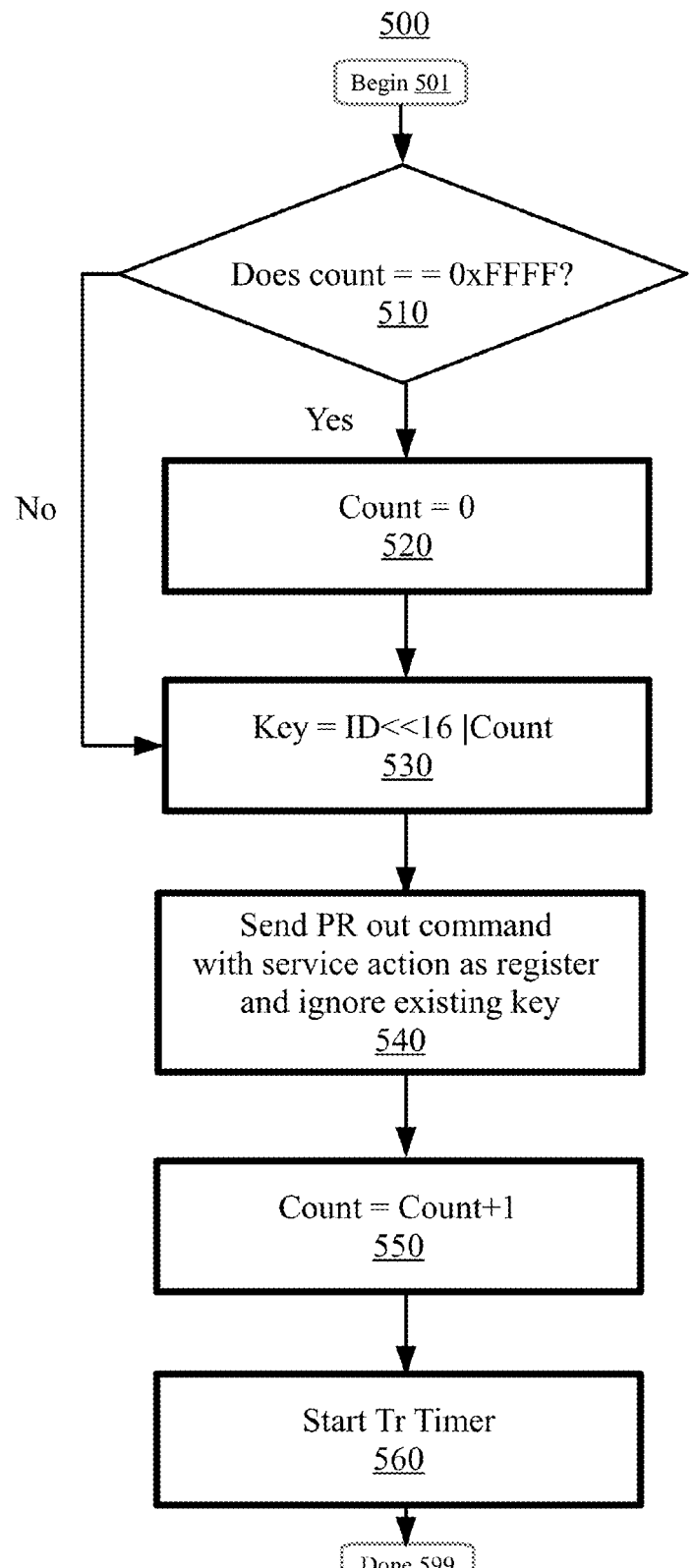
FIG. 5 is a flowchart illustrating a method for operational flow of a registration timer associated with SCSI-PR-based compute node management, according to embodiments.

FIG. 5 is a flowchart illustrating a method 500 for operational flow of a registration timer associated with SCSI-PR-based compute node management. Aspects of FIG. 5 relate to using a registration timer to manage the timing of PR-key value incrementation and PR registration. In embodiments, aspects of FIG. 5 may substantially correspond to other embodiments described herein and illustrated in FIGS. 1-6. The method 500 may begin at block 501.

Aspects of the disclosure relate to configuring a set of compute nodes of a compute node cluster to periodically submit a PR registration request including a PR registration key to a master node (e.g., to indicate an active operational status). As described herein, the format of the SCSI-PR registration key values may include a 64-bit compound number having both a node identifier (e.g., to identify the node that submitted the registration) and an incrementation value (e.g., a running counter to indicate an active state) configured to start at 0 and increase to 0xFFFF. In embodiments, at block 510 the count of the incrementation value may be evaluated to determine whether or not it is equivalent to 0xFFFF (e.g., the maximum value). If the count equals 0xFFFF, it may be reset to 0 at block 520 (e.g., the incrementation counter may be configured to rollback to 0 after reaching the maximum value).

In embodiments, if the count is not equivalent to 0xFFFF, an algorithm may be performed to derive the SCSI-PR registration key (e.g., an updated key) at block 530. For instance, the algorithm used to derive the PR registration key may include "Key=ID<<16|Count" (e.g., left shift the ID value by 16 bits to the left and then perform a bitwise OR operation with the current value of the count, where "<<" represents the bitwise left shift operator and "|" is the bitwise OR operator). At block 540, the PR out command with service action (e.g., PR registration request) may be submitted to a master node. In embodiments, the existing key (e.g., previous key registered for the compute node) may be ignored (e.g., overwritten with the new PR registration key in the central database maintained on the shared disk device server). At block 550, the count of the incrementation counter may be incremented by 1 (e.g., from 0x0000000000020001 to 0x0000000000020002). At block 560, the registration timer Tr may be set to a defined temporal period (e.g., 8 minutes) and configured to count down to 0. In embodiments, when the count of the registration timer reaches 0, the method may repeat from block 510. Other methods of managing PR registration using a registration timer are also possible. The method 500 may conclude at block 599.

Figure 6:
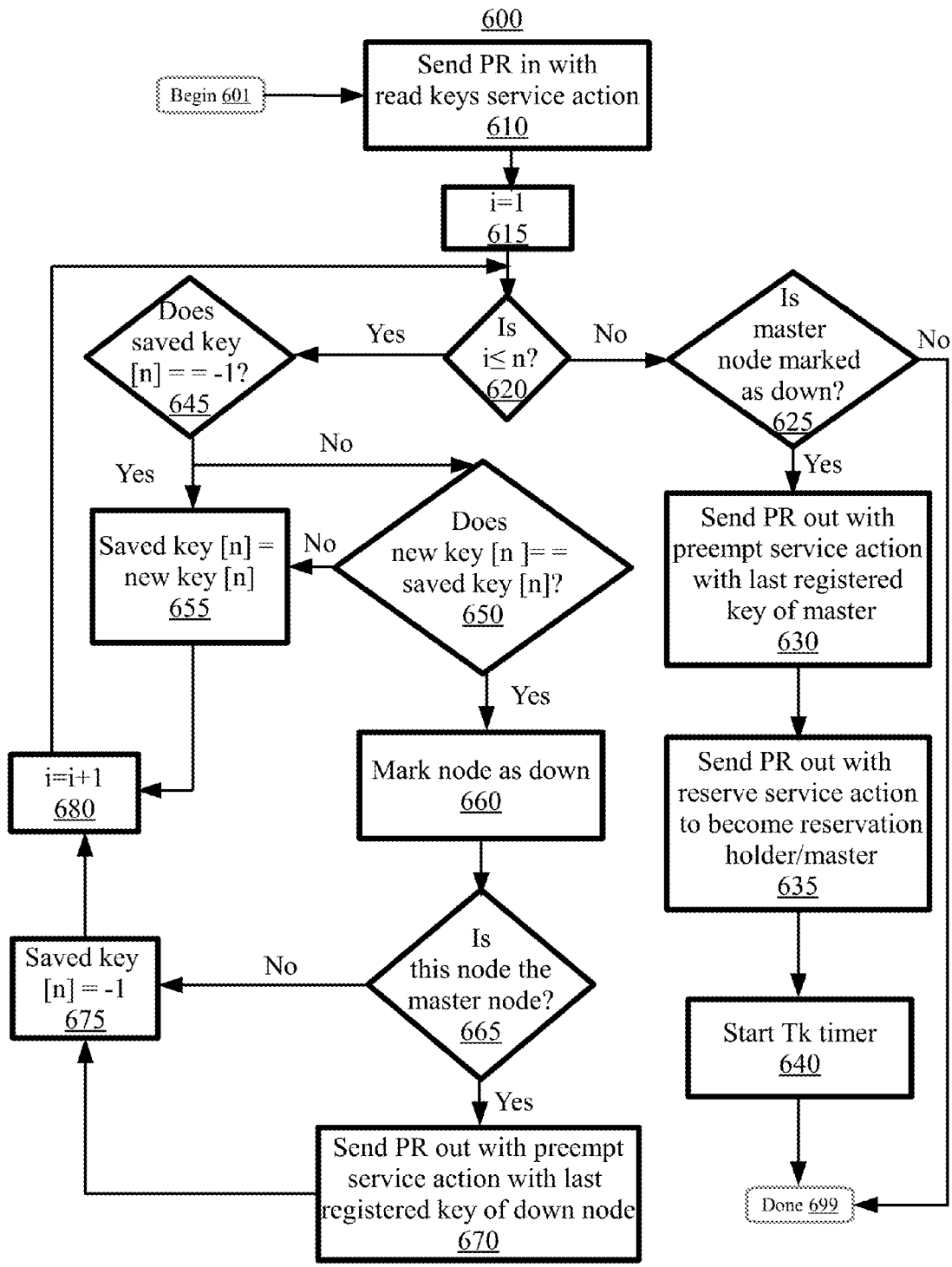
FIG. 6 is a flowchart illustrating a method for operational flow of a key-read timer associated with SCSI-PR-based compute node management, according to embodiments.

FIG. 6 is a flowchart illustrating a method 600 for operational flow of a key-read timer associated with SCSI-PR-based compute node management. Aspects of FIG. 6 relate to using a key-read timer to manage the timing of PR registration key value detection and compute node operational status discovery. In embodiments, aspects of FIG. 6 may substantially correspond to other embodiments described herein and illustrated in FIGS. 1-6.

In embodiments, the method 600 may begin at block 601. A PR registration request and key read service action may be submitted at block 610. In embodiments, the count (e.g., "i") of the incrementation counter may be 1 at block 615. At block 620, it may be determined whether the count "i" is less than or equal to the count of the registration key "n" saved in a central database maintained on a shared disk device server. If "i" is not less than or equal to "n," the method may proceed to block 625 where it may be determined if the master node is marked as down. If the master node is not marked as down, the method may complete at block 699. If the master node is marked as down at block 625, a preempt service action with the last registered key of the master node may be submitted at block 630. A PR request with a reserve service action to become the master node may be submitted at block 635, and the key-read timer Tk may be started at block 640.

In embodiments, if the value of "i" is determined to be less than or equal to the count of the registration key "n," the method may determine whether the saved key [n] is equivalent to −1 (e.g., an invalid value) at block 645. If [n] is determined to be equivalent to −1, then the saved key [n] may be defined (e.g., overwritten) by the new PR registration key at block 655. The method may then proceed to block 680 where the count "i" is incremented by 1, and the method returns to prior to block 620 (e.g., to repeat). If the saved key [n] is determined to not be equivalent to −1, then it may be determined whether the new PR registration key is equivalent to the saved PR registration key at block 650. If the new PR registration key does not equal the saved PR registration key, the saved key may be set to the new key at block 655, and the method may continue. If the new PR registration key is determined to equal the saved PR registration key at block 650, the compute node corresponding to the PR registration key may be marked down (e.g., out of service) at block 660. At block 665, it may be determined whether the out-of-service node is the master node. If the node that is marked down is not the master node, then the saved key may be set to −1 at block 675 and the method may continue. If the node that is marked down is determined to be the master node at block 665, then a PR command with a preempt service action with the last registered key of the out-of-service node may be submitted at block 670. The method may then proceed to block 675 and continue.

As described herein, a set of monitor nodes may be selected from among the compute nodes of the cluster to monitor the PR registration procedure for each compute node, and detect any error events that occur in association with one or more compute nodes. In embodiments, aspects of FIG. 6 relate toward using a key-read timer (e.g., Tk) to manage the time interval at which the monitor nodes examine the PR registration information for the compute nodes of the cluster. The key-read timer may be associated with a particular node of the set of monitor nodes. In embodiments, the key-read timers may be synchronized between monitor nodes (e.g., each monitor node checks the PR registration status for the compute nodes at the same time). In embodiments, the key-read timers may be staggered between monitor nodes (e.g., each monitor node checks the PR registration status for the compute nodes at a different time). In certain embodiments, the key-read timer may be calibrated to be twice the time interval of the registration timer. For instance, if the registration timer is configured to 4 minutes, the key-read timer may be configured to 8 minutes. Other methods of configuring the key-read timer are also possible.

In embodiments, the key-read timer may be configured to tick down toward 0 from the determined time interval. In response to the time interval elapsing (e.g., the key-read timer reaching 0), a SCSI-PR read command may be instantiated. Accordingly, one or more monitor nodes associated with the elapsed timer may consult a central database (e.g., maintained on a shared disk device server) and inspect the PR registration status of the compute nodes. In the event there is no saved data in the central database for the set of compute nodes (e.g., the PR registration procedure has just been initialized, and no compute nodes have yet registered), the key-read timer may be restarted. If there is saved data (e.g., previously saved PR registration keys) for the set of compute nodes in the central database, the one or more monitor nodes may be configured to compare a newly received PR registration key with the previously saved PR registration key. If the newly received PR registration key matches the previously saved PR registration key, the corresponding compute node may be marked as "out-of-service" (e.g., it was unable to complete the PR registration process.) In embodiments, if the master node itself has been marked down, then a new master node may be elected from among the set of monitor nodes. Once PR registration verification has been completed, the key-read timer may be reset.

Consider the following example. There may be four compute nodes in a particular compute node cluster, each node associated with a node ID. For instance, the node IDs for the compute nodes may include 0x0000000000000001, 0x0000000000000002, 0x0000000000000003, and 0x0000000000000004, respectively. As described herein, the node IDs for the compute nodes may be processed using an algorithm to derive a key value for each node. In embodiments, the algorithm "Key=ID<<16|Count" may be used to derive key values of 0x0000000000010000, 0x0000000000020000, 0x0000000000030000, and 0x0000000000040000 may be calculated for the four compute nodes, respectfully.

As described herein, the key values of the four compute nodes may be configured to increment upon each completion of the registration timer, and register the new PR registration key value with the master node. In embodiments, the registration timer may be set to 2 minutes. The set of monitor nodes may be configured to read (e.g., verify) the PR registration keys based on a key-read timer set to twice the registration timer value (e.g., 4 minutes.) Initially, the first time the registration timer completes, the count may be 0 and the four key values may be unchanged. As such, each of the four compute nodes may perform PR registration and register their corresponding PR registration key values with the master node. The second time the registration timer completes, the algorithm may re-derive the key values and generate a new PR registration key for each node by incrementing the previous key values. For instance, the first node may have a new PR registration key of "0x0000000000010001", the second node may have a new PR registration key of 0x0000000000020001, the third node may have a new PR registration key of 0x0000000000030001, and the fourth node may have a new PR registration key of 0x0000000000040001. As described herein, in response to incrementation of the PR registration key, each node may register with the master node and the central database may be updated with the new PR registration keys for each node. Subsequent to completion of the PR registration process, the key-read timer may reach 0, and the monitor nodes may read the PR registration key for each node to verify that each key has incremented. If no error event is detected (e.g., each compute node successfully updated its PR registration), the registration timer and key-read timer may reset.

Aspects of the disclosure relate to the recognition that, in certain embodiments, one or more compute nodes of the cluster may encounter an error event. For instance, after several iterations of PR registration, the PR registration keys for the compute nodes may become 0x0000000000010004, 0x0000000000020003, 0x0000000000030004, and 0x0000000000040004. When the key-read timer reaches 0 and the monitor nodes read the key values for each compute node, it may be determined that Node 2 has failed to register a new PR registration key (e.g., due to an error event). Accordingly, Node 2 may be marked as out-of-service in the central database. In certain embodiments, notification of the error event may be transmitted to a network administrator, other compute node, remote server, or the like. In embodiments, as described herein, the error event may be detected, and an error event response action may be determined and initiated.

Aspects of method 600 may provide performance or efficiency benefits for managing a cluster of compute nodes in a shared pool of configurable computing resources. For example, aspects of method 600 may have positive impacts with respect to compute node operational state determination. As described herein, the monitoring, detecting, determining, and initiating described herein may each occur in an automated fashion without user intervention. Altogether, leveraging SCSI-PR techniques to monitor compute node activity (e.g., heartbeat) may facilitate efficient compute node cluster management (e.g., without using disk input/output operations or dedicated disks).

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for managing a cluster of compute nodes in a shared pool of configurable computing resources using a set of Small Computer System Interface Persistent Reservation (SCSI-PR) commands, the method comprising:
    receiving a cluster data set, with the cluster data set including information indicative of a plurality of identities of compute nodes in the shared pool of configurable computing resources;
    selecting a sub-set of monitor compute node identities from the plurality of identities of compute nodes based, at least in part, upon a compute node reliability factor associated with each given compute node of the plurality of identities of compute nodes, with the compute node reliability factor being: (i) an indication of consistency of performance for the selected monitor compute node, and (ii) expressed in terms of a reliability factor value, with the reliability factor value being a positive numeric integer;
    monitoring, using the set of SCSI-PR commands, the sub-set of monitor compute nodes for an error event;
    detecting, based on a set of values derived from the set of SCSI-PR commands, the error event;
    determining, with respect to the error event, an error event response action; and
    initiating performance of the error event response action.

2. The method of claim 1, further comprising:
    capturing, based on a first SCSI-PR command of the set of SCSI-PR commands, a first value with respect to a first monitor compute node of the sub-set of monitor compute nodes;
    detecting, based on a second SCSI-PR command of the set of SCSI-PR commands, a second value with respect to the first monitor compute node of the sub-set of monitor compute nodes;
    comparing, with respect to the first monitor compute node, the first value with the second value; and
    determining that the first value matches the second value;
    wherein the first and second values correspond to a set of SCSI-PR registration key values.

3. The method of claim 2, wherein the first and second SCSI-PR commands are a same command carried-out at different times, and wherein the second SCSI-PR command occurs in response to the first SCSI-PR command.

4. The method of claim 2, further comprising:
    discovering an operational status of the first monitor compute node both:
        without disk input-output from an access operation, and
        independent of Transmission Control Protocol/Internet Protocol (TCP/IP).

5. The method of claim 2, wherein the sub-set of monitor compute nodes has a shared disk.

6. The method of claim 2, wherein a format of the set of SCSI-PR registration key values includes:
    a node identifier, and
    an incrementation value in a range from 0 to 0xFFFF.

7. The method of claim 2, further comprising:
    waiting, based on a set of registration timers for the set of SCSI-PR registration key values, for a temporal period; and
    incrementing, in response to waiting for the temporal period, the set of SCSI-PR registration key values.

8. The method of claim 1, wherein: the reliability factor is based, at least in part, upon historical performance data for the selected monitor compute node.

9. The method of claim 8, wherein the historical performance data for the selected monitor compute node includes: (i) records of service outage frequency, (ii) hardware component specification information, and/or (iii) maintenance-related information.

10. The method of claim 1, further comprising:
    determining that a set of reliability factor values respectively associated with each given monitor compute nodes of the sub-set of monitor compute nodes exceeds a reliability threshold; and
    responsive to the determination that the set of reliability factor values respectively associated with each given monitor compute nodes of the sub-set of monitor compute nodes exceeds the reliability threshold, selecting each given monitor compute node of the sub-set of monitor compute nodes.

11. The method of claim 10, further comprising:
    distributing the sub-set of selected monitor compute nodes among a plurality of racks, a plurality of separate physical locations, and a set of different domains.

12. The method of claim 10, further comprising:
    instantiating, by the sub-set of selected monitor compute nodes, a set of SCSI-PR registrant only commands; and
    identifying a master node among the sub-set of selected monitor compute nodes.

13. The method of claim 1, wherein the error event response action includes:
    sensing that the first compute node was indicated as the master node; and
    re-instantiating the set of SCSI-PR registrant only commands.

14. The method of claim 1, wherein the error event response action includes:
    marking one or more compute nodes with an out-of-service status.

15. The method of claim 14, wherein the error event response action includes:

preventing usage of the one or more compute nodes that have been marked with the out-of-service status.

16. The method of claim 1, wherein the monitoring, the detecting, the determining, and the initiating each occur in an automated fashion without user intervention.

17. The method of claim 1, further comprising:
metering use of the set of SCSI-PR commands; and
generating an invoice based on the metered use.

18. A system for managing a cluster of compute nodes in a shared pool of configurable computing resources using a set of Small Computer System Interface Persistent Reservation (SCSI-PR) commands, the system comprising:
a memory having a set of computer readable computer instructions, and
a processor for executing the set of computer readable instructions, the set of computer readable instructions including:
receiving a cluster data set, with the cluster data set including information indicative of a plurality of identities of compute nodes in the shared pool of configurable computing resources,
selecting a sub-set of monitor compute node identities from the plurality of identities of compute nodes based, at least in part, upon a compute node reliability factor associated with each given compute node of the plurality of identities of compute nodes, with the compute node reliability factor being: (i) an indication of consistency of performance for the selected monitor compute node, and (ii) expressed in terms of a reliability factor value, with the reliability factor value being a positive numeric integer,
monitoring, using the set of SCSI-PR commands, the sub-set of monitor compute nodes for an error event,
detecting, based on a set of values derived from the set of SCSI-PR commands, the error event,
determining, with respect to the error event, an error event response action, and
initiating performance of the error event response action.

19. A computer program product for managing a cluster of compute nodes in a shared pool of configurable computing resources using a set of Small Computer System Interface Persistent Reservation (SCSI-PR) commands, the computer program product comprising a computer readable storage medium having program instructions embodied therewith, wherein the computer readable storage medium is not a transitory signal per se, the program instructions executable by a processor to cause the processor to perform a method comprising:
receiving a cluster data set, with the cluster data set including information indicative of a plurality of identities of compute nodes in the shared pool of configurable computing resources;
selecting a sub-set of monitor compute node identities from the plurality of identities of compute nodes based, at least in part, upon a compute node reliability factor associated with each given compute node of the plurality of identities of compute nodes, with the compute node reliability factor being: (i) an indication of consistency of performance for the selected monitor compute node, and (ii) expressed in terms of a reliability factor value, with the reliability factor value being a positive numeric integer;
monitoring, using the set of SCSI-PR commands, the sub-set of monitor compute nodes for an error event;
detecting, based on a set of values derived from the set of SCSI-PR commands, the error event;
determining, with respect to the error event, an error event response action; and
initiating performance of the error event response action.

20. The computer program product of claim 19, wherein at least one of:
the program instructions are stored in the computer readable storage medium in a data processing system, and wherein the program instructions were downloaded over a network from a remote data processing system; or
the program instructions are stored in the computer readable storage medium in a server data processing system, and wherein the program instructions are downloaded over a network to a remote data processing system for use in the computer readable storage medium with the remote data processing system.

* * * * *